United States Patent
Cheng et al.

(10) Patent No.: US 7,839,558 B2
(45) Date of Patent: Nov. 23, 2010

(54) ELECTROWETTING DISPLAY AND METHODS FOR MANUFACTURING THE SAME

(75) Inventors: Chao-Kai Cheng, Hsinchu County (TW); Wan-Wen Chiu, Hsinchu County (TW); Chung-Wei Wang, Taipei County (TW); Wei-Yuan Cheng, Taipei County (TW); Kuo-Lung Lo, Taipei County (TW)

(73) Assignee: Industrial Technology Research Technology, Hsinchu (TW)

( * ) Notice: Subject to any disclaimer, the term of this patent is extended or adjusted under 35 U.S.C. 154(b) by 7 days.

(21) Appl. No.: 12/126,784

(22) Filed: May 23, 2008

(65) Prior Publication Data

US 2009/0040591 A1 Feb. 12, 2009

(30) Foreign Application Priority Data

May 25, 2007 (TW) ............................. 96118688 A

(51) Int. Cl.
*G02B 26/00* (2006.01)
*G02F 1/01* (2006.01)
*G02F 1/133* (2006.01)

(52) U.S. Cl. .................... 359/290; 359/276; 349/33
(58) Field of Classification Search ......... 359/290–293, 359/295, 315–316, 276, 238, 245, 242, 259, 359/244, 253–254, 265; 349/33
See application file for complete search history.

(56) References Cited

U.S. PATENT DOCUMENTS

2006/0285067 A1* 12/2006 Kim .......................... 349/187
2007/0031097 A1* 2/2007 Heikenfeld et al. ......... 385/129
2007/0127108 A1* 6/2007 Hayes et al. ................ 359/245
2008/0297880 A1* 12/2008 Steckl et al. ................ 359/291
2009/0027751 A1* 1/2009 Chen et al. ................. 359/228

FOREIGN PATENT DOCUMENTS

| CN | 1864191 | 11/2006 |
|---|---|---|
| CN | 1864191(A) | 11/2006 |
| CN | 1881003 | 12/2006 |
| CN | 1881003(A) | 12/2006 |
| CN | 101359091 | 2/2009 |
| CN | 101359091(A) | 2/2009 |

* cited by examiner

*Primary Examiner*—Scott J Sugarman
*Assistant Examiner*—Dawayne A Pinkney
(74) *Attorney, Agent, or Firm*—Finnegan, Henderson, Farabow, Garrett & Dunner, LLP

(57) ABSTRACT

An electrowetting display comprises a first substrate and a second substrate. A plurality of first conductive electrodes is formed over the first substrate. A second conductive layer is formed over the second substrate and spaced apart from the plurality of the first conductive electrodes. A plurality of cells is formed over the first conductive electrodes. Each cell is formed between one of the first conductive electrodes and the second conductive layer. Each two adjacent cells being separated by a partition. At least two cells include a first material and a second material over the first material. The at least two cells have two different colors. A shape of the first material is capable of being changed upon a change of an electrical field between the first conductive electrode and the second conductive layer.

16 Claims, 5 Drawing Sheets

ELECTROWETTING DISPLAY AND METHODS FOR MANUFACTURING THE SAME

TECHNICAL FIELD

The present application generally relates to electrowetting displays and methods for manufacturing the same.

BACKGROUND

Reflective displays are generally considered to be one of the main display technologies for many current and future applications. In recent years, a number of different technologies have been proposed for use in reflective displays. Electrowetting is one of the technologies for display applications, such as for high brightness color displays.

One of conventional approaches to realize color electrowetting display is to use an RGB color filter in combination with electrowetting display units. This approach may have certain advantages compared to electrophoretic and reflective liquid crystal. In some examples, the approach may provide benefits such as low cost, low power consumption, improved color conversion factor and/or fast response. However, some of the incident light may be absorbed by the color filter and may reduce the brightness or contrast of the display. An example of a single-layer electrowetting display is illustrated in FIG. 1.

Another approach may include using three monochrome layers stacked together, which is known as a tri-layer architecture, an example of which is illustrated in FIG. 2. This approach may offer an improvement in optical performance comparing with the single-layer architecture, such as improvement in color conversion factor. Nevertheless, some designs under this approach have certain drawbacks in some applications, such as complicated manufacturing process and high cost. Moreover, the flexibility of the display may be reduced due to multiple layers. Therefore, it may be desirable for some applications to have an alternative electrowetting display designs, such as designs with low power consumption, low cost, and/or good display performance.

BRIEF SUMMARY OF THE INVENTION

According to one example embodiment of the invention, a method of manufacturing an electrowetting display comprises providing a first substrate having a plurality of first conductive electrodes over the first substrate, providing a second substrate having a second conductive electrode over the second substrate and providing a plurality of cells over the first conductive electrode. Each two adjacent cells are separated by a partition. The method further comprises providing a first material of a first color in a first cell and providing the first material in a second color in a second cell. A shape of the first material having the first color and the second color is capable of being changed upon an application of an electrical field between a corresponding first conductive electrode and the second conductive electrode.

According to another example embodiment of the invention, an electrowetting display comprises a first substrate and a second substrate. A plurality of first conductive electrodes is formed over the first substrate. A second conductive layer is formed over the second substrate and spaced apart from the plurality of the first conductive electrodes. A plurality of cells is formed over the first conductive electrodes. Each cell is formed between one of the first conductive electrodes and the second conductive layer. Each two adjacent cells being separated by a partition. At least two cells include a first material and a second material over the first material. The at least two cells have two different colors. A shape of the first material is capable of being changed upon a change of an electrical field between the first conductive electrode and the second conductive layer.

According to another example embodiment of the invention, an electrowetting display comprises a first substrate and a second substrate. A first conductive layer is formed over the first substrate. A dielectric layer is formed over the first conductive layer. A second conductive layer is formed over the second substrate and spaced apart from the first conductive layer. A plurality of cells is formed between the dielectric layer and the second conductive layer. Each two adjacent cells are separated by a partition. At least two cells include a first material and a second material over the first material. The at least two cells have two different colors. A shape of the first material is capable of being changed upon a change of an electrical field between the first conductive layer and the second conductive layer.

According to another example embodiment of the invention, an electrowetting display comprises a first substrate and a second substrate. A first conductive layer is formed over the first substrate. A dielectric layer is formed over the first conductive layer. A hydrophobic layer is formed over the dielectric layer. A second conductive layer is formed over the second substrate and spaced apart from the first conductive layer. A plurality of cells is formed between the hydrophobic layer and the second conductive layer. Each two adjacent cells are separated by a partition. At least two cells include a first material and a second material over the first material. The at least two cells have two different colors. A shape of the first material is capable of being changed upon a change of an electrical field between the first conductive layer and the second conductive layer.

BRIEF DESCRIPTION OF THE DRAWINGS

The following detailed description of the invention will be better understood when read in conjunction with the appended drawings. For the purpose of illustrating the invention, there are shown in the drawings examples which are presently preferred. It should be understood, that the invention is not limited to the precise arrangements and instrumentalities shown. In the drawings.

DETAILED DESCRIPTION

The electrowetting displays consistent with the embodiments of the invention will now be described with reference to the drawings. Wherever possible, the same reference numbers will be used throughout the drawings to refer to the same or like elements.

Figure 1:
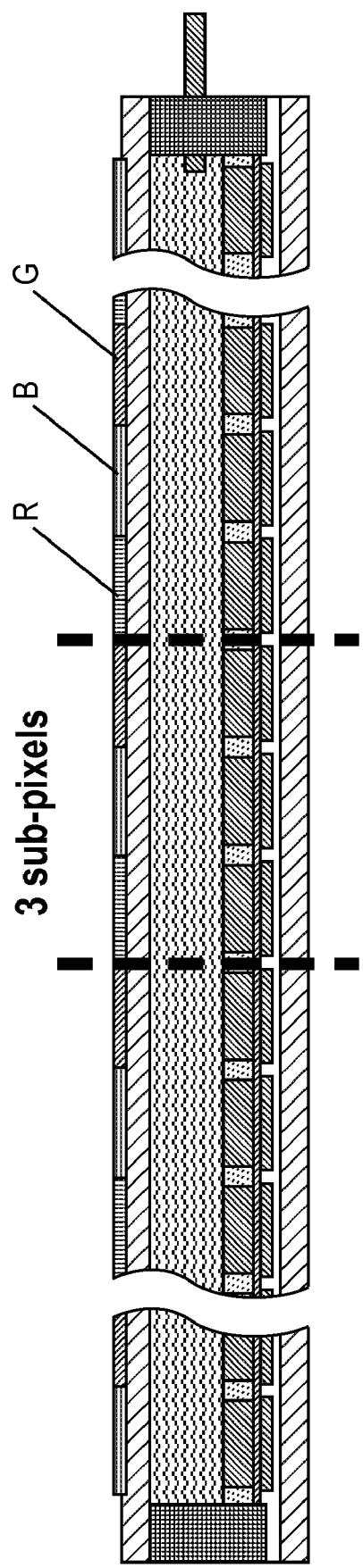
FIG. 1 illustrates a single-layer electrowetting display according to the prior art.
Figure 2:
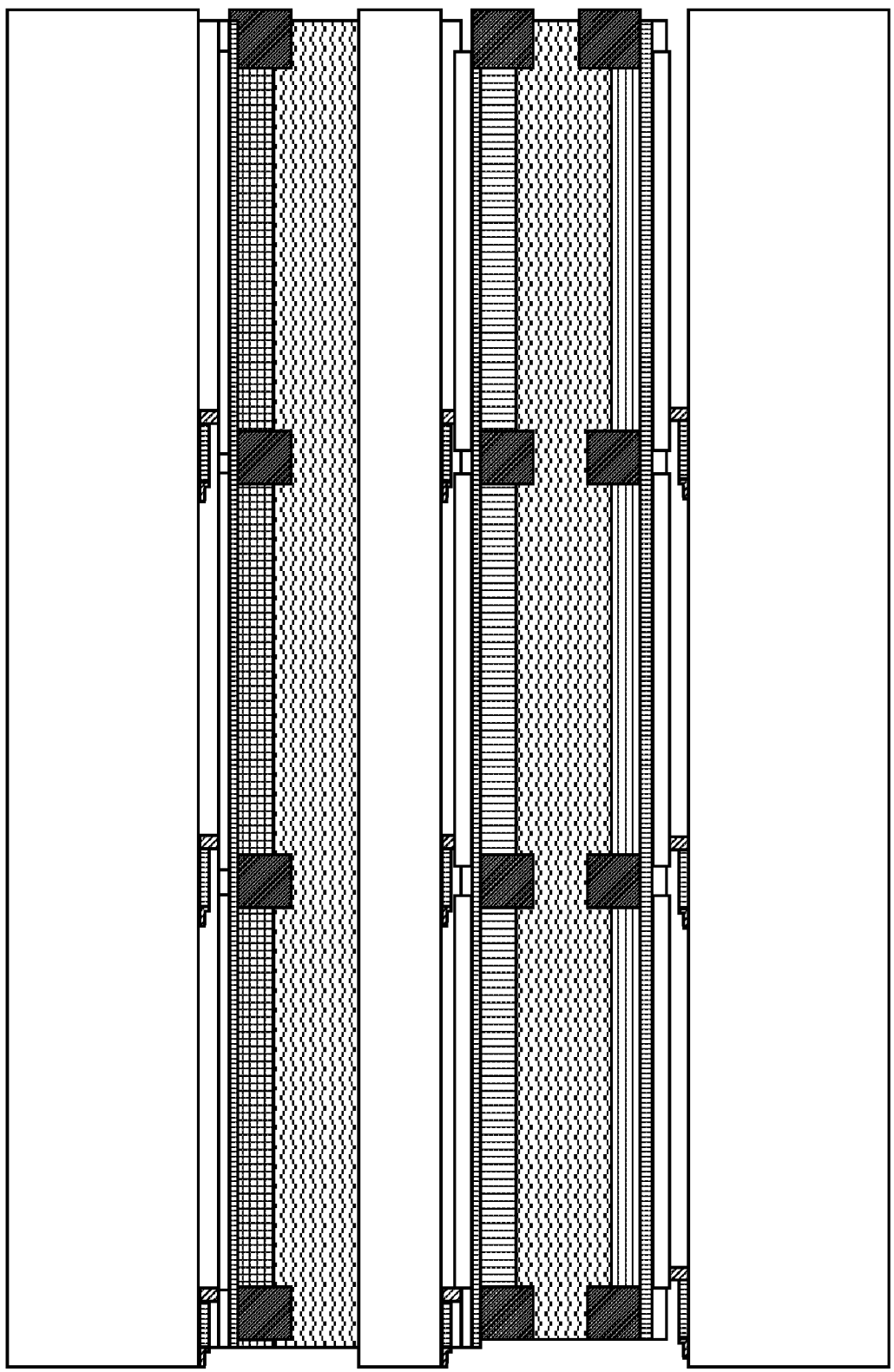
FIG. 2 illustrates a three-layer electrowetting display according to the prior art.
Figure 3:
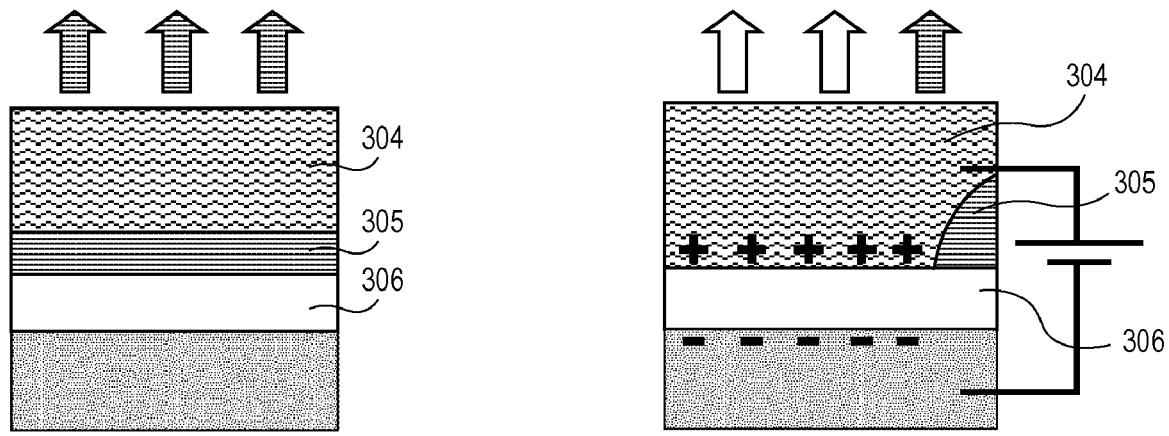
FIG. 3 illustrates exemplary operations of an electrowetting display.

The general principle of electrowetting technologies is that when no electric field is applied (shown on the left in FIG. 3), a colored non-polar liquid 305 may naturally spread over an underlying layer 306. As an example, a reflective electrowetting display unit may show the color of the non-polar liquid 305 to a viewer. In contrast, when an electric field is applied, due to the electrowetting effect, a conductive liquid 304 will approach the underlying layer 306 which causes a change in the shape of the colored non-polar liquid 305 or pushes aside the non-polar liquid 305, resulting in reflection of incident light by the underlying layer 306. Depending on the color of the non-polar layer and the color of the underlying layer 306, the change in the electric field may change the color of the display. FIG. 3 illustrates an exemplary operation based on the principle.

Figure 4:
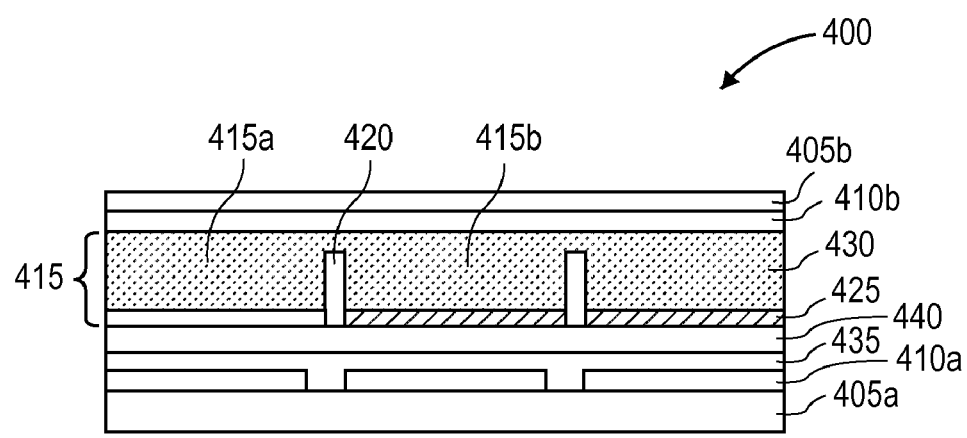
FIG. 4 illustrates a reflective electrowetting display consistent with the present invention.

FIG. 4 illustrates a reflective electrowetting display 400 manufactured according to exemplary methods (discussed below) of the present invention. The reflective display 400 comprises a first substrate 405a and a second substrate 405b. The substrates 405a and 405b may have a variety of applications, such as a reflecting substrate, a polymeric or any other applications known to the skill in the art. A first and second conductive layers 410a and 410b are coated over the substrates 405a and 405b, respectively, spaced apart from each other and faced each other. The first and second conductive layers 410a and 410b may be made of light transmissive material, such as indium tin oxide (ITO) or indium zinc oxide (IZO). A plurality of cells 415 may be formed between the first and the second conductive layers 410a and 410b using a photolithography procedure or other well-known methods. Each two adjacent cells are separated by a partition 420. For example, the partition 420 is disposed between cells 415a and 415b to separate one from the other. The partition 420 may extend to the second conductive layer 410b or may not thus having a continuous space between the cells 415 and the second conductive layer 410b. Cell gap, i.e. the thickness of cells 415, plays an essential role because it determines the amount of contents inside the cell. The cell gap may be uniform across the display, resulting in a uniform electro-optic response. A typical cell gap is around 50 μm and can be as small as 25 μm. The cell gap may vary based on various designs or applications.

To realize a color display, each cell 415 comprises a first material 425. The first material 425 in different cells may be of at least two colors. For example, the cells 415a and 415b may display red light and blue light, respectively, due to the dyes or pigment contained in the first material 425. More different colors may be included in the neighboring cells, thus making it possible to form color pixels and provide a color display. Some treatments may be applied to the first conductive layer 410a and/or the partitions 420, so as to make each of them immiscible with the first material 425. Those treatments may include plasma, atmosphere plasma or UV ozone or any other well-known treatments. The first material 425 may comprise a non-polar liquid or specifically, may be a hydrocarbon solution. Various materials can be employed depending on applications, such as decane, dodecan, tetradecane and silicone oil.

The reflective electrowetting display 400 may also comprise a second material 430 applied over the first material 425. The second material 430 may comprise a conductive liquid, such as water, ionic solutions, and aqueous surfactants solutions. The second material 430 may be applied using such techniques as ink jet printing, spray printing, dip coating, shower coating or any other techniques known to the skill in the art. The second material 430 may flow throughout the cells thus forming a continuous phase therein.

During an operation of the reflective electrowetting display 400, when there is no voltage applied the color of the display appears as the color of the first material 425. When a proper level of voltage is provided between the first and second conductive layers 410a and 410b, the second material 430, which is enclosed between the two conductive layers 410a and 410b, may be located within a suitable electric field and may be subjected to changing upon the application of the electric field to the second material 430. Therefore, the first material 425 and second material 430 may be driven by balancing between electrostatics and surface tension forces. For example, the shape or the contact angel of the second material 430 may be induced due to the electric charge applied and the first material 425 will be pushed aside by the second material 430. A movement of the second material 430 may also be initiated according to the pattern of electric fields. On removal of the voltage, the shape or the contact angle of the second material 430 may return to its original status and the first material 425 will spread to its original status again. So that the color of the reflective electrowetting display 400 may appear as the color of the first material 425 again.

The reflective electrowetting display 400 also comprises the second substrate 405b coated with the second conductive layer 410b to close the display and to provide an electrical contact to the second material 430, where the second conductive layer 410b is laminated between the second substrate 405b and the second material 430.

In one example embodiment, the reflective electrowetting display 400 may comprise a dielectric layer 435 applied over the first conductive layer 410a. The dielectric layer 435 may be a polymeric layer and may be formed using processes such as ink jet printing, screen printing, spin coating, dip coating, evaporation and sputter deposition or other well-known methods.

In another example embodiment, the reflective electrowetting display 400 may comprise an additional hydrophobic layer 440 applied to the first conductive layer 410a to enhance the movement of the first material 425. The strong hydrophobic nature of this layer separates the first material 425 from the first conductive layer 410a and ensures the spreading of the first material 425 in the field-off state. When a voltage is applied, the hydrophobic surface may become attractive to the second material 430 due to the electrostatic force, thus forcing the first material 425 to change its form. The hydrophobic layer 440 may be ink jet printed, screen printed, dip coated or spin coated to the first conductive layer 410a.

Figure 5:
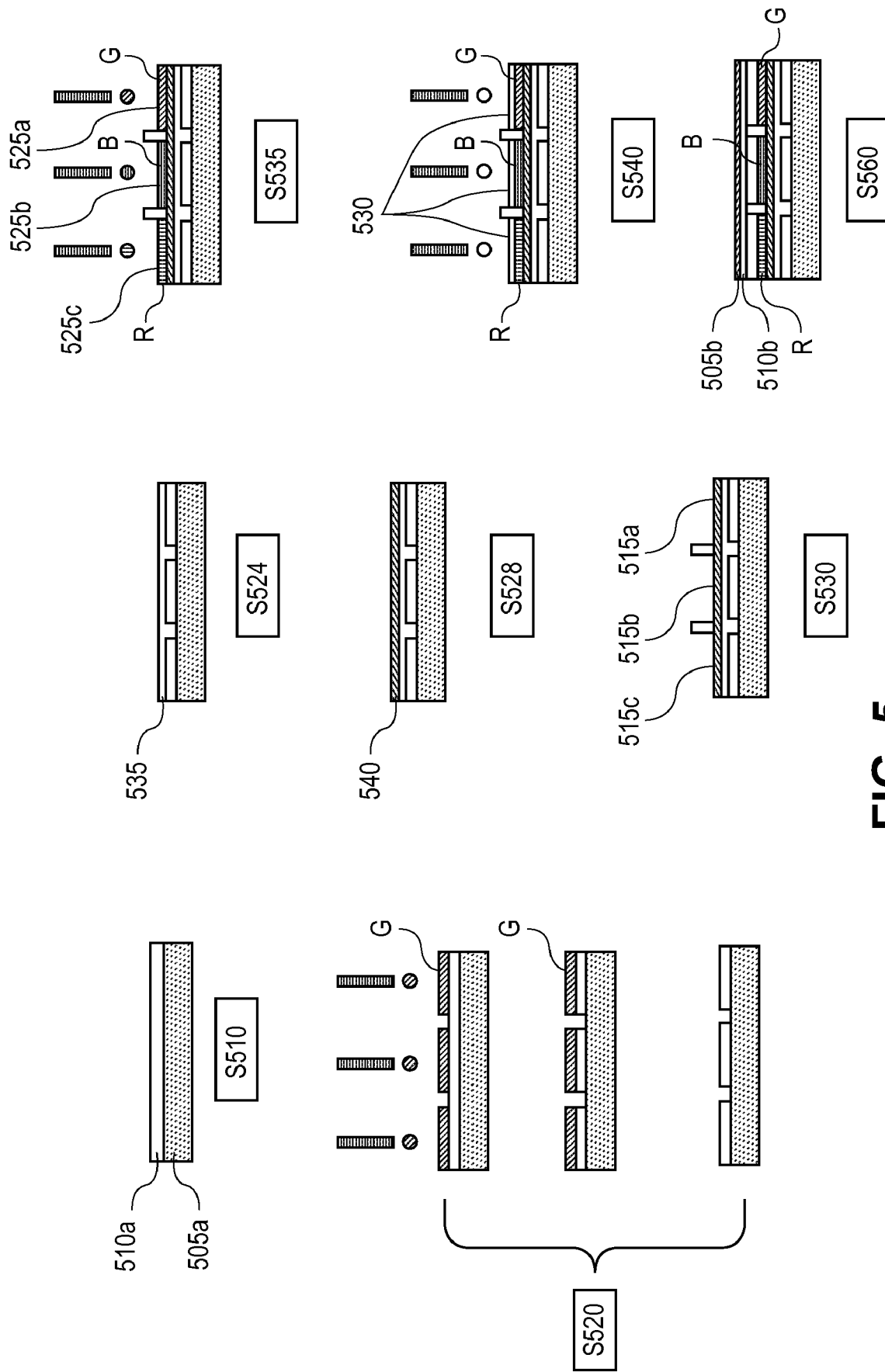
FIG. 5 illustrates an exemplary method of manufacturing an electrowetting display consistent with embodiments of the invention.

There are various methods to accomplish color electrowetting displays. FIG. 5 illustrates one method according to one embodiment of the present invention. Referring to FIG. 5, a first substrate 505a is provided at step S510. As mentioned above, a wide variety of substrates can be employed, ranging from glass for active matrix or segmented displays to flexible polymer substrates. In a preferable embodiment, the substrate 505a may be a reflecting surface which can be exposed and may reflect the light incident thereon upon an application of an electric field. A first conductive layer 510a is coated on the substrate 505a. The first conductive layer 510a may be a light transmissive or transparent layer, such as the indium tin oxide mentioned above.

At step S520, the first conductive layer 510a is patterned to form a plurality of electrodes. Depending upon the material from which the first material 525 are made, the first conductive layer 510a may be deposited using various techniques, such as etching, ink jet printing, screen printing or imprinting processes.

In an example embodiment as shown in FIG. 5, a dielectric layer 535 may be applied over the first conductive layer 510a at step S524. An additional hydrophobic layer 540 is applied over the dielectric layer 535 or the first conductive layer 510a at step S528. The hydrophobic layer 540 is less wettable and in one example comprises amorphous fluoropolymer. The wetting properties of the hydrophobic surface may be modified by the application of the electric field.

At step S530, a number of cells 515, or maybe a number of cell arrays, are formed on the first conductive layer 510 or the hydrophobic layer 540. To obtain a multi-color electrowetting display, a colored first material 525 may be deposited in cells. The first material 525 may be applied simultaneously or sequentially according to different embodiments of the present invention which will be discussed in detail below.

In one example embodiment, the first material 525 of different colors may be applied to cells simultaneously. For example, the first material 525a, which for example a solution of a green dye or pigment, the first material 525b of blue and the first material 525c of red may be applied to cells 515a, 515b and 515c at the same time, as shown at step S535 in FIG. 5. The second material 530 is then applied over the first material 525 of three cells at next step S540. In another example embodiment, the first material 525 of two different colors may be applied together and followed with the deposition of the second material 530. In the final step S560, a second substrate 505b coated with a second conductive layer 510b is deposited on the exposed surface of the second material 530 to form a structure of a reflective electrowetting display. The second conductive layer 510b is laminated between the second substrate 505b and the second material 530.

Figure 6:
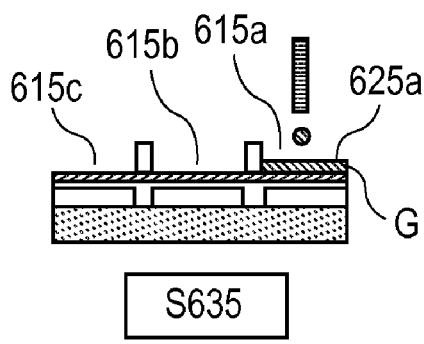
FIG. 6 illustrates another exemplary method of manufacturing an electrowetting display consistent with embodiments of the invention.
Figure 6:
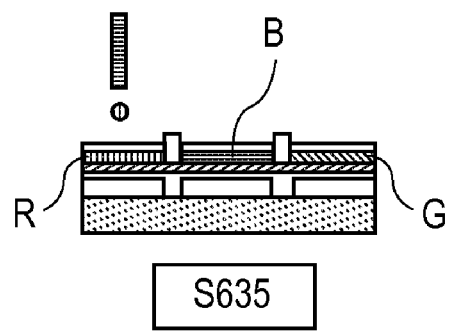
Figure 6:
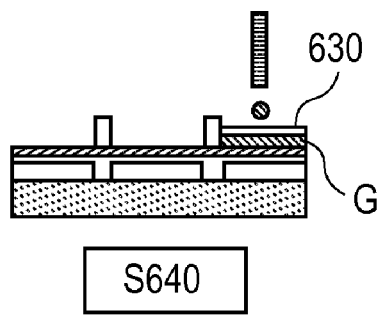
Figure 6:
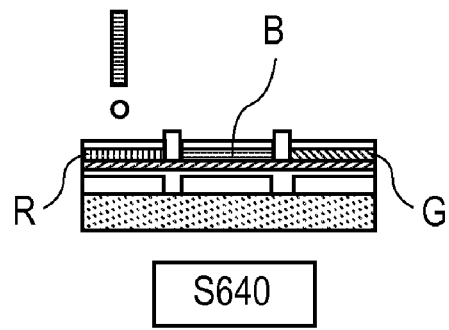
Figure 6:
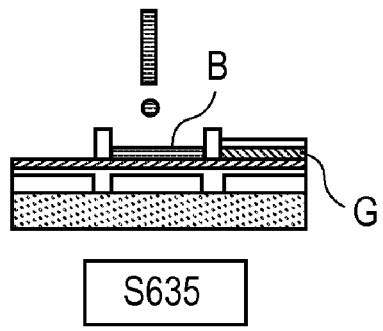
Figure 6:
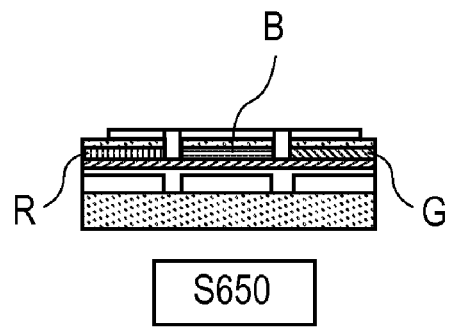
Figure 6:
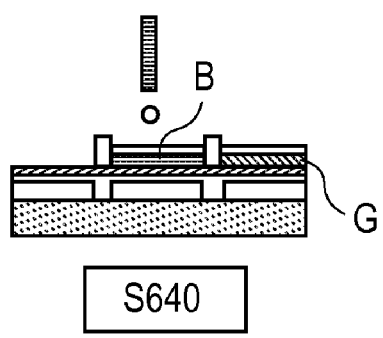
Figure 6:
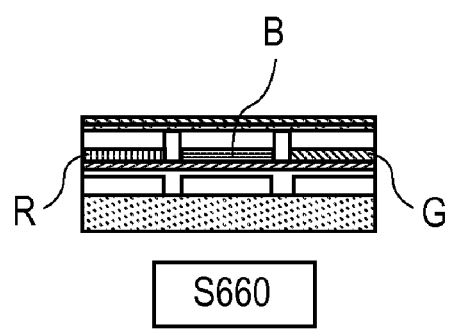

In an alternative example embodiment as shown in FIG. 6, a first material 625 of different colors may be applied sequentially. For example, a first material 625a of green is applied to a cell 615a at step S635 in subsequence with applying a second material 630 at step S640. In this manner, the deposited first material (e.g., 625a) may be protected from contaminating by a to-be-deposited first material (e.g., 625b). The two process steps S635 and S640 are repeated successively with a blue first material 625b and a red first material 625c, thus forming color pixels. The second material 630 may be dispensed across the cells forming a continuous phase through out the display at step S650. The final step S660, similar to the step S560 mentioned above, applying a second substrate coated with a second conductive layer to the surface of the second material 630. The second conductive layer faces to the second material 630 and provides electric contact to the second material 630.

Using the various example embodiments of the present invention, a low-power consumption, flexible, high color brightness reflective electrowetting display is obtained by a relatively simple manufacturing process.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

What is claimed is:

1. A method of manufacturing an electrowetting display, the method comprising:
    providing a first substrate having a plurality of first conductive electrodes over the first substrate;
    providing a dielectric layer over the first conductive electrodes;
    providing a hydrophobic layer over the dielectric layer;
    providing a second substrate and a second conductive electrode over the second substrate;
    providing a plurality of cells over the first conductive electrodes, each two adjacent ones of the cells being separated by a partition, the partition being formed on the hydrophobic layer;
    providing a first material of a first color on the hydrophobic layer in a first one of the cells, and
    providing the first material in a second color on the hydrophobic layer in a second one of the cells,
    wherein a shape of the first material having the first color and the second color is capable of being changed upon an application of an electrical field between a corresponding first conductive electrode and the second conductive electrode.

2. The method of claim 1 further comprising applying a second material over the first material, wherein the second material forms a continuous phase throughout the plurality of cells.

3. The method of claim 2, wherein the second material comprises a conductive liquid.

4. The method of claim 2, wherein the applying of a second material over the first material comprises at least one of ink jet printing, spray printing, dip coating and shower coating the second material.

5. The method of claim 1, further comprising applying the first material to the first and second cells simultaneously and applying a second material over the first material in the first and second cells subsequently.

6. The method of claim 1, wherein the first material comprises a non-polar liquid.

7. The method of claim 1, wherein the providing of the first material comprises ink jet printing the first material.

8. The method of claim 1, wherein the providing of a dielectric layer comprises using at least one of ink jet printing, screen printing, spin coating, dip coating, evaporation and sputter deposition.

9. The method of claim 1, wherein the providing of a hydrophobic layer comprises using at least one of ink jet printing, screen printing, dip coating and spin coating.

10. An electrowetting display comprising:
    a first substrate and a second substrate;
    a plurality of first conductive electrodes formed over the first substrate;
    a hydrophobic layer formed over the first substrate;
    a dielectric layer interposed between the first conductive electrodes and the hydrophobic layer;
    a second conductive layer formed over the second substrate and spaced apart from the plurality of the first conductive electrodes; and
    a plurality of cells, each of the cells being formed between one of the first conductive electrodes and the second conductive layer, each two adjacent ones of the cells being separated by a partition, the partition being formed on the hydrophobic layer, at least two of the cells including a first material and a second material over the first material positioned on the hydrophobic layer, the at least two cells having two different colors, a shape of the first material being capable of being changed upon a change of an electrical field between the first conductive electrode and the second conductive layer.

11. The electrowetting display of claim 10, wherein the first material comprises a non-polar fluid.

12. The electrowetting display of claim 10, wherein the first material is applied to the cells using ink jet printing.

13. The electrowetting display of claim 10, wherein the second material forms a continuous phase throughout the plurality of cells.

14. The electrowetting display of claim 10, wherein the second material comprises a conductive fluid.

15. An electrowetting display comprising:

a first substrate and a second substrate;

a first conductive layer formed over the first substrate;

a hydrophobic layer formed over the first substrate;

a dielectric layer interposed between the first conductive layer and the hydrophobic layer;

a second conductive layer formed over the second substrate and spaced apart from the first conductive layer; and a plurality of cells, each of the cells being formed between the hydrophobic layer and the second conductive layer, each two adjacent ones of the cells being separated by a partition, the partition being formed on the hydrophobic layer, at least two of the cells including a first material and a second material over the first material positioned on the hydrophobic layer, the at least two cells having two different colors, a shape of the first material being capable of being changed upon a change of an electrical field between the first conductive layer and the second conductive layer.

16. An electrowetting display comprising:

a first substrate and a second substrate;

a first conductive layer formed over the first substrate;

a dielectric layer formed over the first conductive layer;

a hydrophobic layer formed over the dielectric layer;

a second conductive layer formed over the second substrate, the second conductive layer being spaced apart from and facing the first conductive layer; and a plurality of cells, each of the cells being formed between the hydrophobic layer and the second conductive layer, each two adjacent ones of the cells being separated by a partition, the partition being formed on the hydrophobic layer, at least two of the cells including a first material and a second material over the first material positioned on the hydrophobic layer, the at least two cells having two different colors, a shape of the first material being capable of being changed upon a change in an electrical field between the first conductive layer and second conductive layer.

* * * * *